United States Patent
Hirota

(10) Patent No.: US 6,270,015 B1
(45) Date of Patent: Aug. 7, 2001

(54) RADIATOR FOR A VEHICLE

(75) Inventor: Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 09/534,289

(22) Filed: Mar. 23, 2000

(30) Foreign Application Priority Data

Mar. 24, 1999 (JP) .................................. 11-078919
Apr. 12, 1999 (JP) .................................. 11-103455

(51) Int. Cl.[7] .................................. B60H 1/02
(52) U.S. Cl. ......................... 237/12.3 B; 62/3.2
(58) Field of Search .......... 237/12.3 B, 12.3 R; 62/3.2, 3.6; 123/41.52

(56) References Cited

U.S. PATENT DOCUMENTS

| | | | |
|---|---|---|---|
| 3,236,056 | * | 2/1966 | Phillips et al. .................. 62/3.61 |
| 3,874,183 | * | 4/1975 | Tabet ................................ 62/323 |
| 3,942,515 | * | 3/1976 | Servos et al. .................. 128/2 R |
| 4,280,330 | * | 7/1981 | Harris et al. ........................ 62/3 |
| 4,453,503 | * | 6/1984 | Freeburn ...................... 123/41.31 |

FOREIGN PATENT DOCUMENTS

| | | |
|---|---|---|
| 197 52 613 | 4/1998 | (DE) . |
| 6-92134 | 4/1994 | (JP) . |

* cited by examiner

Primary Examiner—Harold Joyce
Assistant Examiner—Derek S. Boles
(74) Attorney, Agent, or Firm—Nilles & Nilles SC

(57) ABSTRACT

In a radiator assembly of a water cooled engine driven vehicle, heating is performed by a compartment heat exchanger. As long as the temperature of the cooling water is low, it does not suffice to sufficiently heat by compartment heat exchanger shortly after engine start and an auxiliary heating equipment is used. The auxiliary heating equipment includes a heat exchanger at the heating side, a heat exchanger at the endothermic side and a Peltier element. The Peltier element leads to high energy efficiency because it provides a quantity of heat which is more than the quantity of energy charged into the Peltier element, since it transfers Joule heat generated by the charge energy to the heat exchanger and further transfers a quantity of heat to heat exchanger as absorbed in a heat exchanger at the endothermic side from an endothermic surface of the Peltier element by a Peltier effect to the exothermic side.

15 Claims, 12 Drawing Sheets

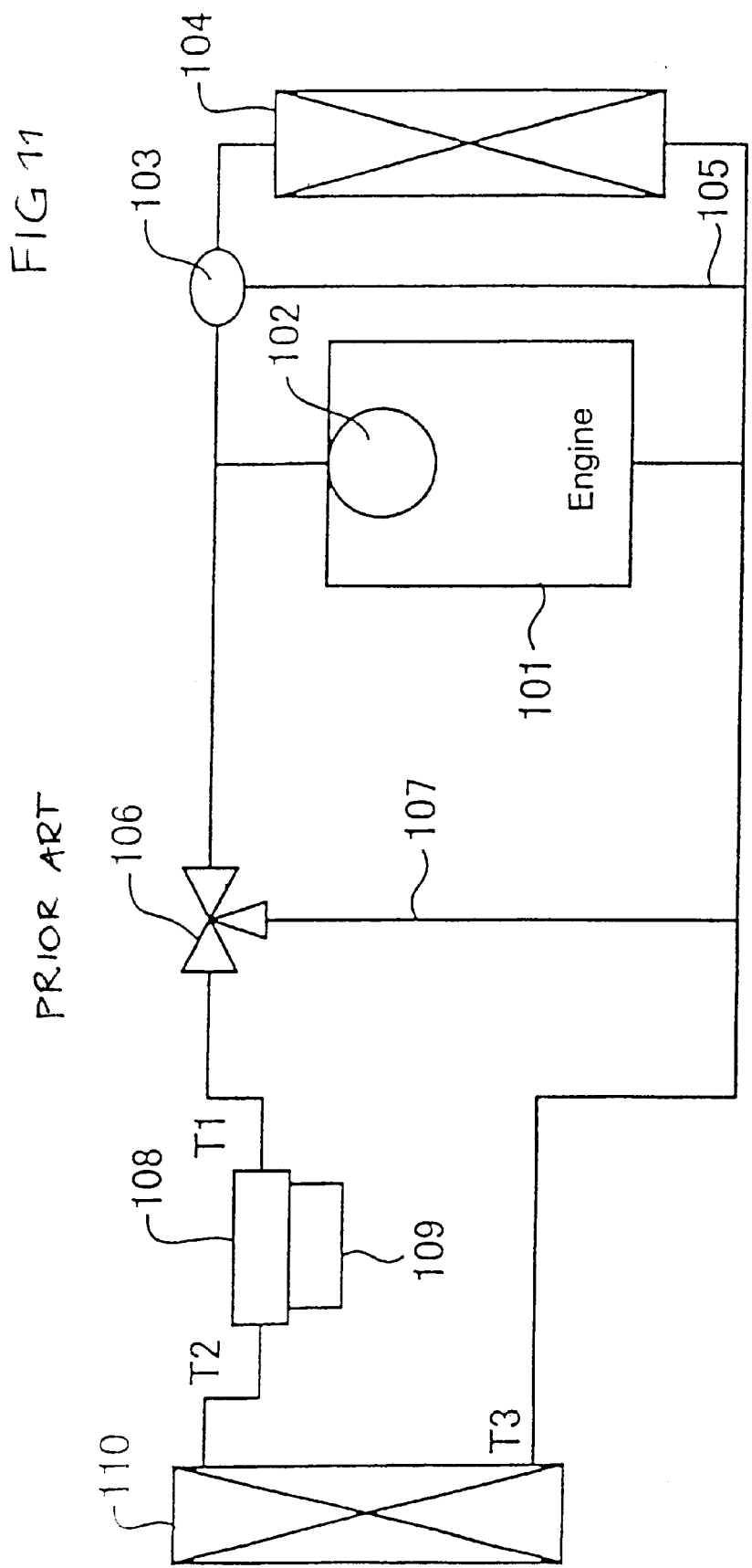

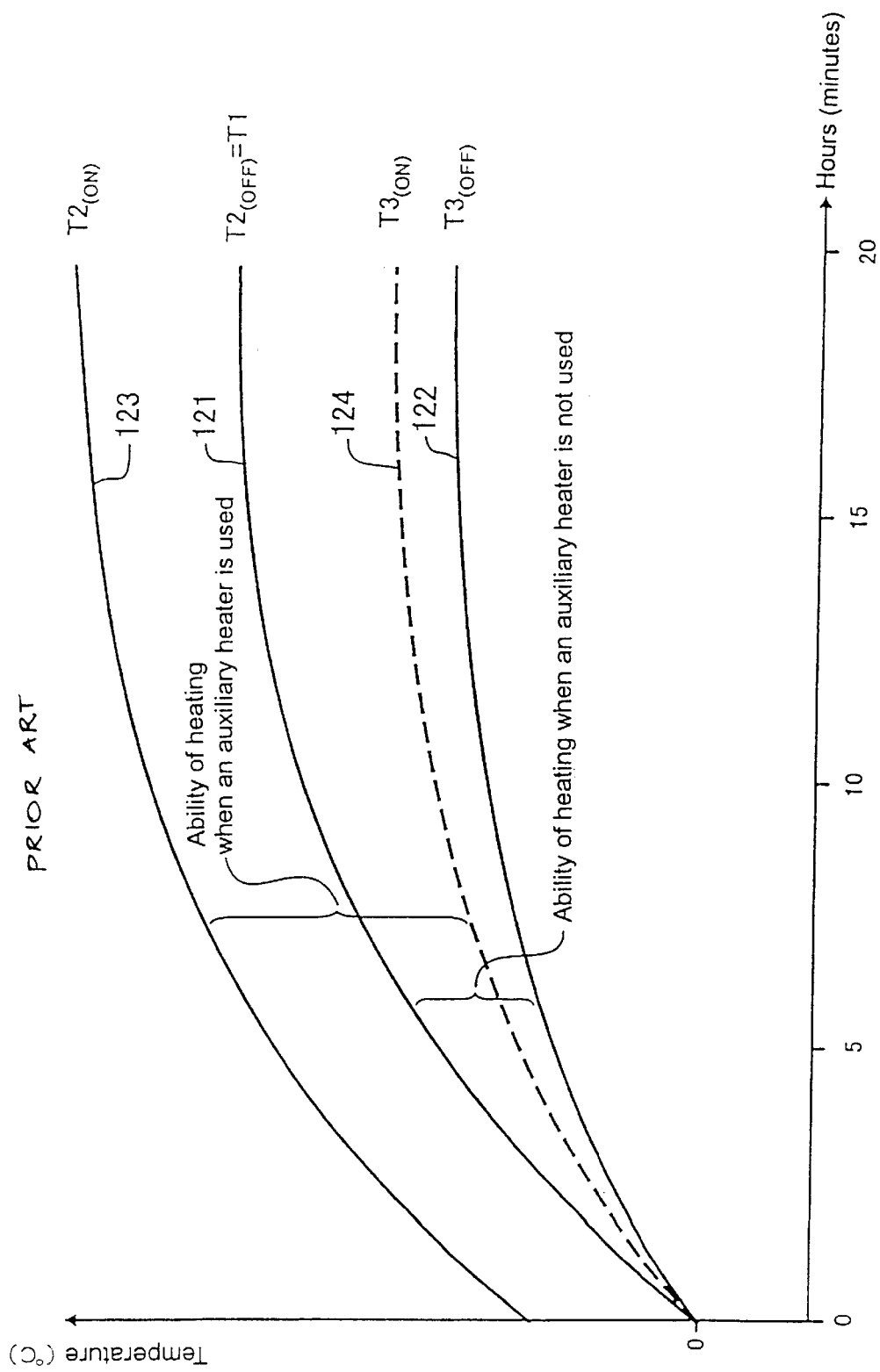

RADIATOR FOR A VEHICLE

BACKGROUND OF THE INVENTION

1. Field of the Invention

The present invention relates to a radiator assembly of the vehicle, particularly of a vehicle using the cooling water of a water cooled engine as a heat source for heating.

In a water cooled engine driven vehicle a radiator assembly is provided for heating purposes by supplying cooling water from the engine to a heat exchanger and heating passing air in the heat exchanger, and supplying the heated air into the compartment of the vehicle. The engine cooling water is used for heating because normally the heat capacity of the cooling water is very large and it normally is possible to obtain the needed and sufficient quantity of heat when the engine is operating. However, as the cooling water temperature remains low for a while particularly after starting the engine in a cold season, it then is not effective to use the cooling water of the engine for heating. In addition, in recently developed engines having high combustion efficiency the quantity of available heat outside the engine generally is relatively small. With such engines the temperature of the cooling water is hard to rise particularly after the engine start. It then is not suitable to use cooling water as a sole heat source for heating for a while after engine start. Conventionally the ability of heating in the warm-up phase after an engine start can be achieved by heating the cool cooling water in order to intentionally accelerate the temperature rise. This is carried out with the help of auxiliary heating equipment. FIG. 11 illustrates a cooling water circuit of a conventional radiator assembly of a vehicle. FIG. 12 shows the variations of the temperature of the conventional radiator assembly. An engine 101 having circulating pump 102 is connected with an inlet port of a thermal changeover valve 103. Said valve 103 has two outlet ports, one connected to an inlet of an engine radiator 104, another connected to a by-pass duct 105 by-passing the engine radiator 104. A junction part between the outlet of the engine radiator 104 and by-pass duct 105 is connected to an inlet port of the engine 101. Circulating pump 102 further is connected with an inlet of a three-ways 106, one outlet port of said valve 106 is connected via a by-pass duct 107 with the inlet port of engine 101. Another outlet port of valve 106 is connected to an inlet port of an auxiliary heat exchanger 108 which is provided with an auxiliary heater 109. The outlet of auxiliary heat exchanger 108 is connected to an inlet of a compartment heat exchanger 110, the outlet of which is connected to the inlet port of the engine 101. An example of such an auxiliary heating equipment having the auxiliary heat exchanger 108 and the auxiliary heater 109 is disclosed in JP patent application Hei 6-92134 (application number Hei 04-246294). The auxiliary heater used is a so-called shear exothermic equipment in which in shear forces act on a viscosity fluid by using the rotating power of the engine. The cooling water is heated by heat thus generated. Cooling water absorbs heat in engine 101 and is discharged by circulating pump 102 into thermal changeover valve 103. The respective passage is switched by said valve 103 according to water temperature. If the temperature is lower than a fixed temperature, valve 103 directs the flow into by-pass duct 105 and directly back into the engine 101. If the temperature is higher than said fixed temperature, valve 103 directs the flow into radiator 104, where the cooling water radiates heat and from where it returns into the engine 101. Another part of the cooling water from engine 101 reaches three-ways valve 106 operating according to the quantity of the heat needed by the compartment heat exchanger 101 and stabilising said quantity for the auxiliary heat exchanger 108 by directing the flow to the auxiliary heat exchanger 108 in case of high heating demand or by directing it to by-pass duct 107 in case of low heat demand. In auxiliary heat exchanger 108 the cooling water exchanges heat with air introduced from the outside of the vehicle or with air circulating in the vehicle via said compartment heat exchanger 110. The temperature then drops and the cooling water returns into the engine 101. When heating is needed and the temperature of the cooling water reaching compartment heat exchanger 110 is low, said auxiliary heater 109 is operated to heat the cooling water flowing into auxiliary heat exchanger 108. From there heated cooling water is supplied into said compartment heat exchanger 110. The temperature of the cooling water leaving engine 101 and entering auxiliary heat exchanger 108 is T1. The temperature of cooling water leaving auxiliary heat exchanger 108 towards compartment heat exchanger 110 is T2. The temperature downstream compartment heat exchanger 110 and in the return duct to engine 101 is T3. In the FIG. 12 the horizontal axis indicates the time after the engine start. The vertical axis indicates the temperature variations. During cruising with heating without operating auxiliary heater 109 the temperature of cooling water from engine 101 through auxiliary heat exchanger 108 into compartment heat exchanger 110 varies with curve 121; it rises gradually. The temperature T1 at the inlet of auxiliary heat exchanger 108 corresponds to temperature T2 (OFF) at the inlet of compartment heat exchanger 110. The outlet temperature T3 (OFF) after heat exchanging compartment heat exchanger 110 varies with curve 122. The difference between curves 121 and 122 represents the ability of heating available by compartment heat exchanger 110 without the assistance of auxiliary heater 109. The ability of heating is poor after engine start. By using auxiliary heater 109 the cooling water is heated in auxiliary heat exchanger 108. The temperature rises from T1 to T2 (ON) and varies with curve 123. Even though heating cooling water with temperature T2 (ON) exchanges heat in compartment heat exchanger 110, temperature T3 (ON) at the outlet will vary with curve 124. Therefore, the difference between curves 123 and 124 represent the heating ability of compartment heat exchanger 110 when the auxiliary heater 109 is operating. A shortage in the heating ability after engine start is supplemented. Further, the significant difference between curves 121 and 123 is effected by the operation of auxiliary heater 109. However, the efficiency of the auxiliary heater is poor.

Another example of an auxiliary heating equipment is discloses in DE-A-19752613. The auxiliary heating equipment of an automobile air conditioning system comprises an electric heater. Said electric heater consists of a NiCr-wire element provided within a section of the cooling water circuit. The efficiency of the electric heater is poor.

OBJECTS AND SUMMARY OF THE INVENTION

It is an object of the present invention to provide a highly efficient radiator assembly of a vehicle equipped with an auxiliary heating equipment.

Said object is achieved, according to the present invention, by a radiator assembly using cooling water of a water cooled engine with a heat source. Said radiator assembly is characterised by a heat exchanging means for heating purposes in the vehicle carrying out a heat exchange between cooling water and air, and by providing at least one exothermic means heating cooling water by heat generated by Peltier effect.

In the radiator assembly the heat exchanging means for heating is not able to heat sufficiently when the temperature of the cooling water is too low shortly after engine start. To compensate for this shortage the cooled cooling water is heated by said exothermic means. The heated cooling water then is supplied to the heat exchanging means for heating. The exothermic means generates heat for heating by the Peltier effect. It thus is possible to obtain the needed quantity of heat generated by the Peltier effect by adding a quantity of heat absorbed from charged energy to a quantity of heat generated by the charged energy. Therefore, the exothermic means allows to generate a higher quantity of heat and more than at least a quantity of the charged energy and constitutes a highly efficient auxiliary heating equipment.

Said exothermic means may include a Peltier element and a heat exchanger adhered to the exothermic side of said Peltier element in order to transmit heat generated by the Peltier element into the cooling water flowing to the heat exchanging means.

Said exothermic means may include a heat exchanging means adhered to an endothermic surface of the Peltier element serving to absorb heat from the cooling water when leaving the heat exchanging means for heating.

As long as the temperature of the cooling water is low shortly after engine start the cooling water supplied to the compartment heat exchanger is heated by both Joule heat of the Peltier element 10 and heat transferred from an endothermic surface to an exothermic surface of the same Peltier element. In thus is possible to add more thermal energy for heating purposes to the cooling water flowing to the heat exchanger at the exothermic side than electric energy is charged into the Peltier element, and to rapidly increase the heating ability of the compartment heat exchanger.

BRIEF DESCRIPTION OF THE DRAWINGS

Embodiments of the invention will be described with the help of the drawings. In the drawing is.

DESCRIPTION OF THE PREFERRED EMBODIMENTS

Figure 1:
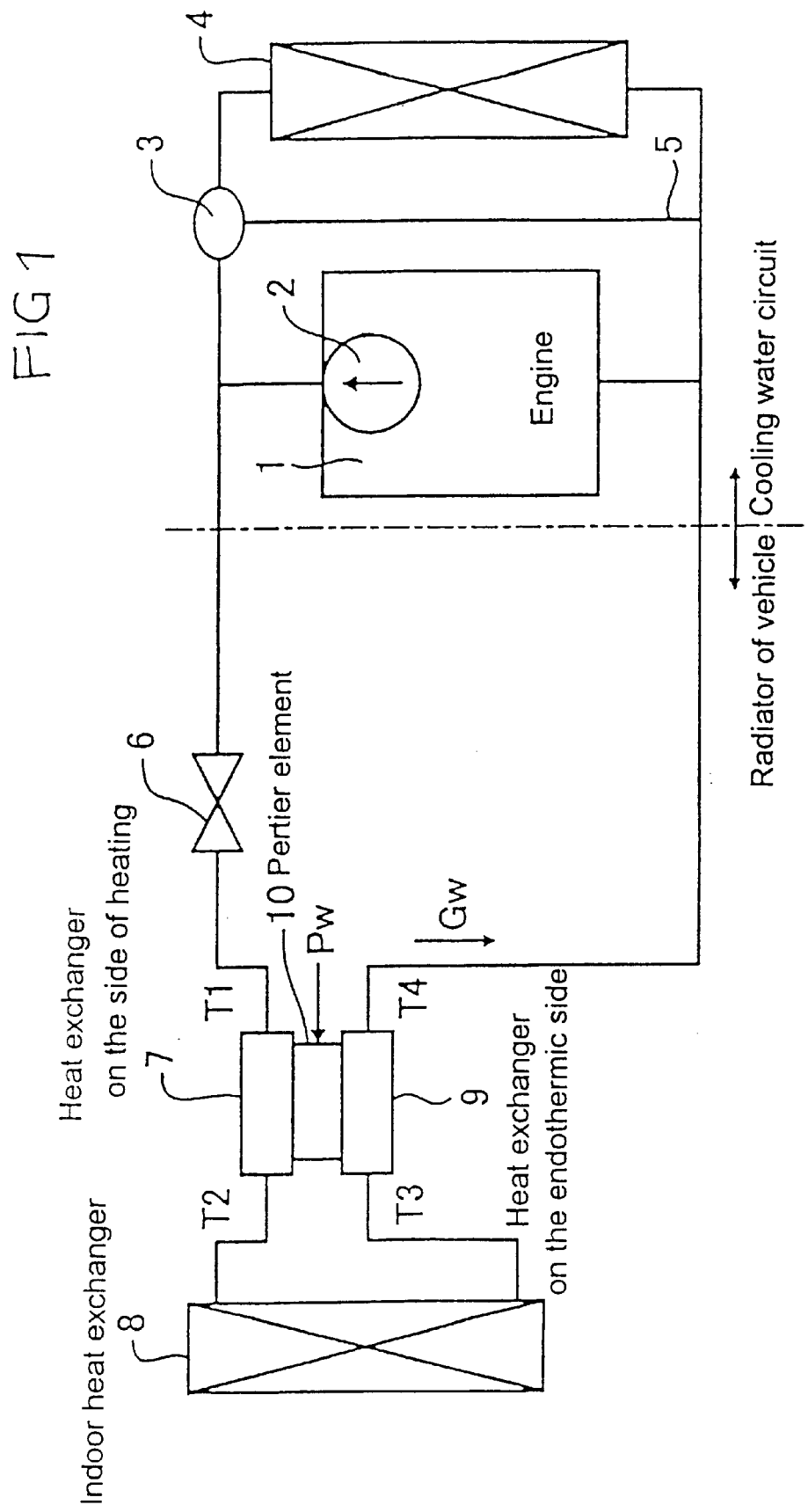
FIG. 1 a block diagram schematically depicting a cooling water circuit relating to a radiator assembly according to the invention, FIG. 2 a diagram of temperature variations, FIG. 3 a schematic perspective view of an auxiliary heating equipment, FIG. 4 a block diagram of a second embodiment of a radiator assembly according to the invention, FIG. 5 a block diagram of the second embodiment in an operation state shortly after engine start, FIG. 6 a diagram of temperature variations, FIG. 7 a block diagram of a third embodiment of a radiator assembly according to the invention, FIG. 8 a block diagram of said third embodiment in at a condition shortly after engine start, FIG. 9 a block diagram of a fourth embodiment of a radiator assembly according to the invention, in a condition shortly after engine start, FIG. 10 a block diagram of the cooling water circuit of the fourth embodiment, FIG. 11 a block diagram of a cooling water circuit comprising a conventional radiator assembly, and FIG. 12 a diagram of temperature variation for the conventional radiator assembly.

A right-half of FIG. 1 represents the cooling water circuit 1. A left-half of FIG. 1 represents a radiator assembly of the vehicle using the engine cooling water as a heat source. A circulating pump 2 of engine 1 compulsively exhausts cooling water into a water jacket of engine 1. An outlet port of circulating pump 2 is connected to an inlet port of a thermal changeover valve 3 which has two outlet ports, one of which connected to an inlet of an engine radiator 4, the other connected to a by-pass duct 5 by-passing engine radiator 4. A joining part between radiator 4 and by-pass duct 5 leads to an inlet port of engine 1.

Circulating pump 2 further is connected to an inlet port of a throttle valve 6, the outlet port of which is connected to an inlet port of a heat exchanger 7 at the heating side of the assembly. An outlet port of heat exchanger 7 is connected to an inlet port of a compartment heat exchanger 8, the outlet port of which is connected to a heat exchanger 9 provided at the endothermic side. Between heat exchanger 7 and heat exchanger 9 at the endothermic side a Peltier element 10 is adhered. Said components constitute an auxiliary heating equipment. The outlet of heat exchanger 9 is connected via a return duct to the inlet port of the engine 1.

Instead of throttle valve 6 a three-ways valve and the by-pass duct may be used. At an arbitrary location within a closed circuit including engine 1, heat exchanger 7, compartment heat exchanger 8 and heat exchanger 9 a pump might be installed.

Heat originating from engine 1 is absorbed by the cooling water. If the temperature is lower than a fixed temperature, in thermal changeover valve 3 downstream circulating pump 2 the cooling water is directly returned through by-pass duct 5 to engine 1. If the temperature is higher than said fixed temperature, heat from the cooling water is radiated in engine radiator 4 from which the cooling water returns to engine 1.

The heating radiator assembly includes a closed circuit where a part of the cooling water exhausted from circulating pump 2 circulates from throttle valve 6 through heat exchanger 7, compartment heat exchanger 8, heat exchanger 9 to the inlet port of engine 1. If the quantity of heat in the cooling water is high enough, the degree of opening of throttle valve 6 is adjusted corresponding to the ability of heating needed for compartment heat exchanger 8.

The temperature of the cooling water leaving engine 1 to heat exchanger 7 is T1. The temperature downstream heat exchanger 7 for compartment heat exchanger 8 is T2. The temperature downstream compartment heat exchanger 8 for heat exchanger 9 is T3. The temperature heat exchanger 9 is T4.

Figure 2:
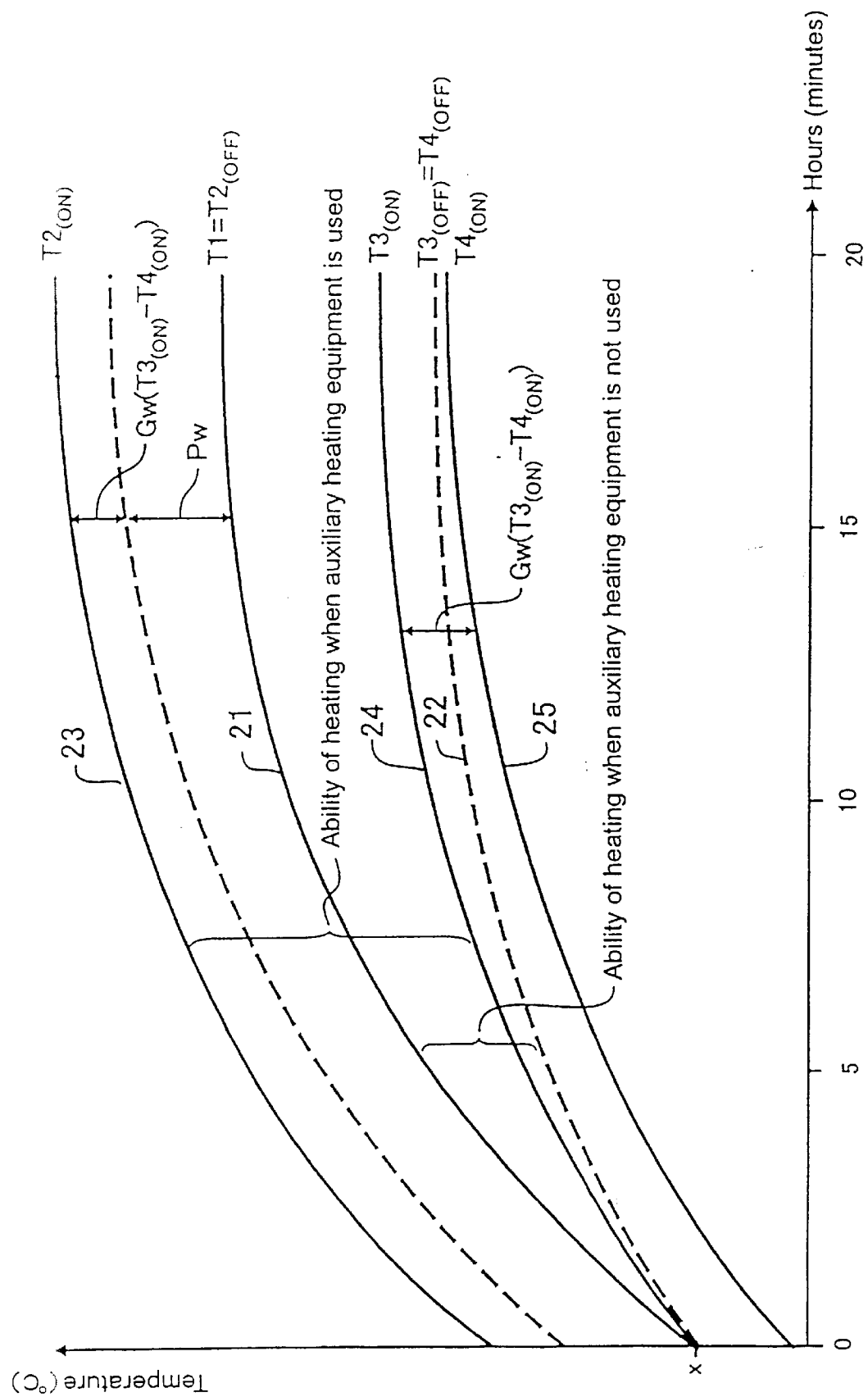

In FIG. 2 a horizontal axis shows time expiring after engine start. The vertical axis shows the temperature variations in the cooling water. The temperature of the cooling water at the engine starting time X° C.

Driving with heating without using the auxiliary heating equipment:

After engine start temperature gradually rises from X° C. and the temperature between heat exchanger 7 and compartment heat exchanger 8 changes with curve 21. Temperature T1 at the inlet of heat exchanger 7 is the same as temperature T2 (OFF) at the inlet of compartment heat exchanger 8. The cooling water exchanges heat in compartment heat exchanger 8 and the temperature at the heat exchanger 9 gradually rises from X° C. and follows curve 22. Then temperature T3 (OFF) at the outlet of compartment heat exchanger 8 is the same as temperature T4 (OFF) at the outlet of heat exchanger 9. Therefore, the difference between curves 21 and 22 represent the ability of heating of compartment heat exchanger 8 without using the auxiliary heating equipment. The ability of heating is poor shortly after engine start.

Driving with heating using the auxiliary heating equipment:

The temperature rises to the influence of heat exchanger 7 from T1 to T2 (ON) and varies with curve 23. Since the cooling water of temperature T2 (ON) exchanges heat in the compartment heat exchanger 8, temperature T3 (ON) varies with curve 24. Since the cooling water of temperature T3 (ON) also exchanges heat at heat exchanger 9, temperature T4 (ON) at the outlet varies with curve 25. That means, cooling water returns to engine 1 when the temperature is lower than the temperature at the engine start due to the influence of heat exchanger 9 at the endothermic side, i.e. curve 25 is starting from a temperature lower than X° C. Therefore, the difference between curves 23 and 24 represent the increased ability of heating of the compartment heat exchanger 8 when using the auxiliary heating equipment a state where the shortage of the heating ability shortly after engine start is supplemented.

The Peltier element 10 uses the Peltier effect allowing by flowing electric current to absorb heat from the endothermic side where the temperature of a surface falls and to transfer the heat to the exothermic side where the temperature of the surface rises. Even thought the heat transfer quantity changes depending on the initial conditions, almost 50% of electric power can effectively be used in the Peltier element 10. This results in a coefficient of about 0.5. However, even if the resulting coefficient is 0.5 when using the Peltier element 10 in a refrigerating equipment, calorific power at the exothermic side of the Peltier element can be expressed by the sum of the quantity of heat absorbed at the endothermic side and Joule heat generated by the electric current flowing through the Peltier element 10 when using it as an auxiliary heating component. As a result, the resulting coefficient can be as high as about 1.5. In a conventional electric heater, the resulting coefficient is at most 1.0. In a comparison, the resulting coefficient of 1.5 of the Peltier element 10 is much better.

Supplementing the effect of the Peltier element 10, the quantity of heat transferred from the endothermic side to the exothermic side by the Peltier element 10 can be expressed by the value GW (T3 (ON)–T4 (ON)). That means that the temperature difference between inlet and outlet of heat exchanger 9 at the endothermic side is multiplied by the quantity of the cooling water. If the quantity of heat originating from Joule heat generated by the electric power charged into the Peltier element 10 is expressed by PW, temperature T2 at the inlet (the curve 23) of compartment heat exchanger 9 is the sum of the temperature T1 at the inlet (curve 21) of heat exchanger 7, of the quantity of heat PW generated by the Peltier element 10 itself, and of the transferred quantity of heat GW (T3) (ON)–T4 (ON)).

Figure 3:
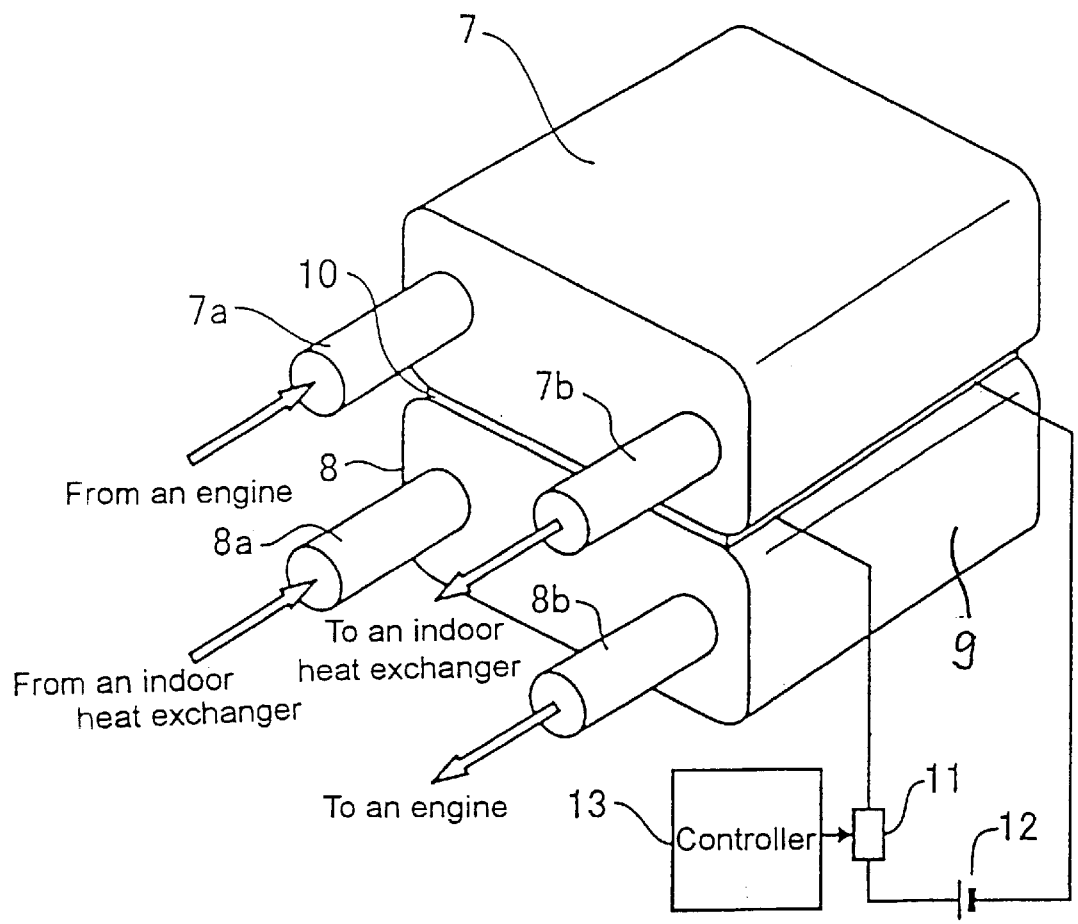

The Peltier element 10 of the auxiliary heating equipment of FIG. 3 is situated between heat exchanger 7 at the side of heating and heat exchanger 9 at the endothermic side. Both heat exchangers 7, 9 are provided with inlet ports and outlet ports 7a, 8a; 7b, 8b. Inlet port 7a and outlet port 7b are connected to engine 1. Inlet port 8a and outlet port 8b are connected to compartment heat exchanger 8.

At Peltier element 10 the endothermic surface and the exothermic surface can be inverted depending on the flow direction of the electric current. The polarity of a lead wire is chosen so that the exothermic surface is on the side of the heat exchanger 7 while the endothermic surface is at the side of heat exchanger 9. The lead wire extends via an electric current controller 11 and a battery 12. An input of electric current controller 11 is connected to an output of a controller 13. Controller 11 controls the auxiliary heating operating of the Peltier element 10 by controlling the value of the electric current. If auxiliary heating is needed after engine start controller adjust the electric current to 100%. As soon as the temperature of the cooling water has increased enough and the temperature rise has reached a saturated state auxiliary is no longer necessary. Then the electric current is adjusted to 0%. Control methods of the electric current controller 11 may be an analogue control, and on/off control, a pulse width modulation control, or the like.

Figure 4:
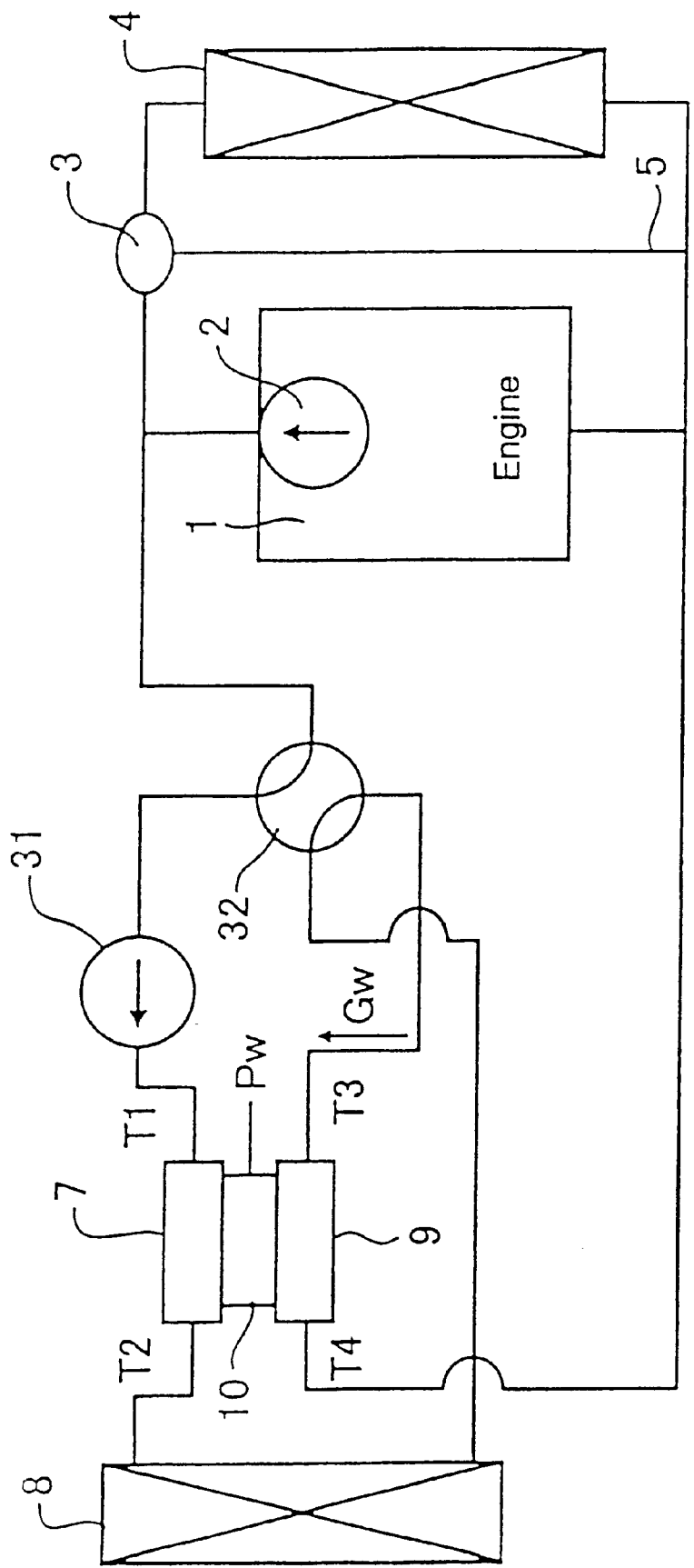

In the second embodiment of the radiator assembly of FIG. 4 a pump 31 and four-ways valve 32 are located between engine 1 and heat exchanger 7. Four-ways valve 32 also is located between compartment heat exchanger 8 and heat exchanger 9 at the endothermic side.

A valve (not shown) for controlling the quantity of flow or the flow rate may be provided between pump 31 and four-ways valve 32. Instead the flow rate may be controlled by adjusting the degree of rotation or adjustment of the four-ways valve 32.

Cooling water from engine 1 flows through four-ways valve 32 and pump 31 into heat exchanger 7, is heated by heat exchanger 7 and flows into compartment heat exchanger 8, where it exchanges heat with the air inside the vehicle, and finally flows through four-ways valve 32 into heat exchanger 9. After heat is absorbed here the cooling water returns to engine 1. It is possible to execute the same auxiliary heating operation as in FIG. 1.

Figure 5:
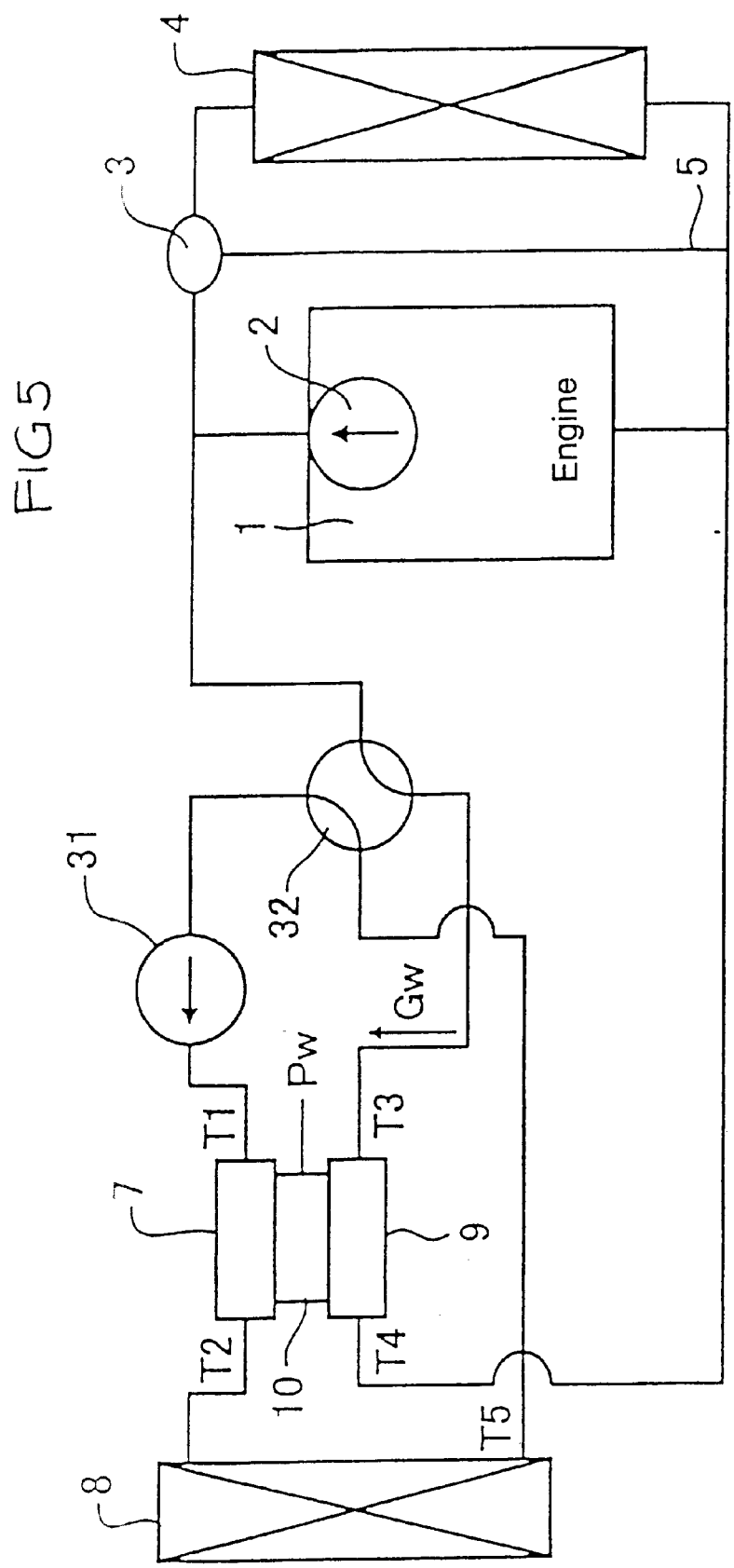

FIG. 5 is a block diagram representing the state after engine start for the second embodiment. By four-ways valve 32 it is possible to separate the circuit for the flow to heat exchanger 7 and compartment heat exchanger 8 from another circuit in which the cooling water returns to engine 1. In other words, first circuit is formed in which the cooling water from engine 1 returns via four-ways valve 32 and heat exchanger 9 to engine 1. Independently, a second closed circuit is formed in which the cooling water returns from the four-ways valve 32 through pump 31, heat exchanger 7 and compartment heat exchanger 8 back to four-ways valve 32. The Joule heated generated by Peltier element 10 and the quantity of heat absorbed from the cooling water of engine 1 are supplied into the close circuit of compartment heat exchanger 8.

The load of compartment heat exchanger 8 is decided by the quantity of the air flow (quantity of wind) passing compartment heat exchanger 8 and the air temperature. As long as the load of compartment heat exchanger is small the quantity of heat exchanged by compartment heat exchanger 8 is smaller than the quantity heated by heat exchanger 7. In this case, a phenomen occurs. The temperature at the outlet of compartment heat exchanger 8 becomes higher than temperature T1 at the inlet of heat exchanger 7. In the configuration of FIG. 4 high temperature cooling water leaving compartment heat exchanger 8 is cooled by heat exchanger 9 so that the cooling water for the engine is heated further. Caloric power of the cooling water in the engine 1 generally is large. Therefore, even if the cooling water for the engine is heated by the high temperature cooling water returning from compartment heat exchanger 8 temperature T1 at the outlet of engine 1 to heat exchanger 7 will not rise suddenly. This means that the temperature of the cooling water entering compartment heat exchanger 8 rises slowly, since the cooling water entering heat exchanger 7 is heated at low temperature only.

If the temperature at the outlet of compartment heat exchanger 8 is higher than the temperature at the outlet of the engine 1, i.e., then the temperature at the inlet of heat exchanger 7, (FIG. 5), it is possible to transfer the entire quantity of heat supplied by heat exchanger 7 to compartment heat exchanger 8 by correspondingly switching the four-ways valve 32 and forming a close circuit with the radiator assembly separated from the cooling water circuit of the engine.

Figure 6:
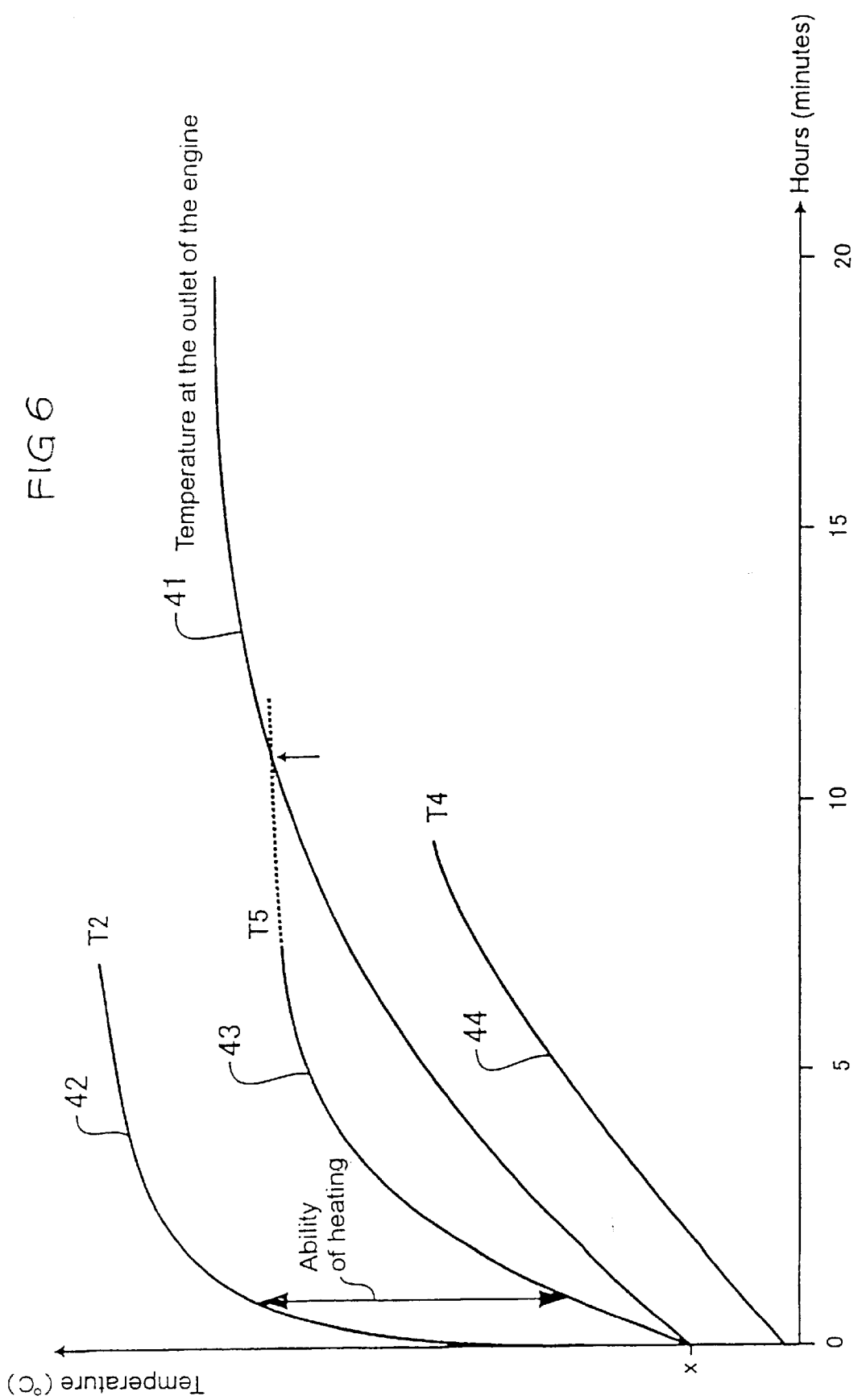

FIG. 6 illustrates temperature variations in said closed radiator circuit. After engine start four-ways valve 32 is switched as in FIG. 5 to form said closed circuit. The temperature of the cooling water in said circuit is at the engine side after engine start almost the same as in FIG. 2. Temperature varies with curve 41. Temperature at heat exchanger 7 first is the same as the temperature at the engine (X° C.). Temperature T2 at compartment heat exchanger 8 varies with curve 42 because the cooling water is heated by heat exchanger 7. The calorific power or capacity of the closed circuit is smaller than the calorific power at the engine side. As a consequence, temperature T2 at the inlet of compartment heat exchanger 8 rises comparatively sharply. Since the quantity of heat exchanged by compartment heat exchanger 8 is small (the load of the compartment heat exchanger 8 is small) temperature, T5 at the outlet of heat exchanger 8 rises significantly and temperature T5 varies with curve 43. The difference between curves 42 and 43 represent the increased heating ability.

On the other hand, in the other circuit on the engine side the cooling water from engine 1 flows through four-ways valve 32 into heat exchanger 9 at the endothermic side where heat is absorbed. Therefore, temperature T4 at the outlet of heat exchanger 9 varies with curve 34.

If the temperature of the cooling water in the circuit at the radiator side rises sharply, the cooling water is separated soon. To the contrary, the temperature of the cooling water at the engine side only rises gradually. If the temperature at engine 1 is higher than the temperature T5 at the outlet of compartment heat exchanger 8, four-ways valve 32 is switched to form a circuit of FIG. 4. The timing for switching valve 32 depends on the load of compartment heat exchanger 8. Valve 32 is switched early if the load is small, and is switched late if the load is large.

Figure 7:
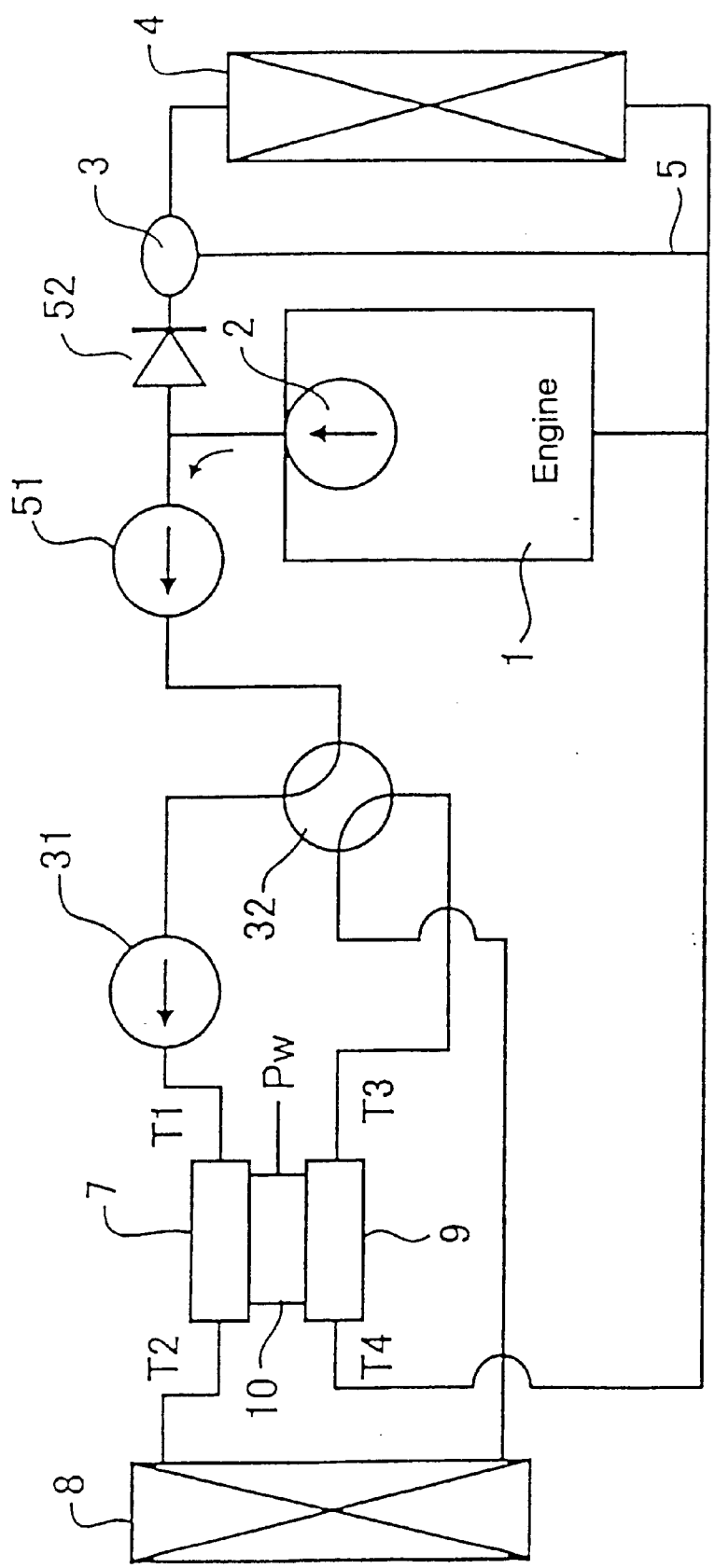

In the third embodiment of FIG. 7 a pump 51 is inserted between the outlet port of engine 1 and four-ways valve 32. A check valve 52 is provided between the outlet port of engine 1 and thermal changeover valve 3. Said check valve 52 allows a flow from engine 1 to thermal changeover valve 3. Thermal changeover valve 3 may be structurally combined with check valve 52.

As soon as the temperature of the cooling water of engine 1 is high enough, it is discharged by circulating pump 2 via check valve 52 into a circuit of the engine radiator 4. Further cooling water is directed through pump 51, four-ways valve 32, pump 31 and heat exchanger 7 to compartment heat exchanger 8. After heat exchange with air for the compartment of the vehicle the cooling water returns via four-ways valve 32, heat exchanger 9 and to engine 1.

It is expedient to implement this configuration into a vehicle having an engine intended for low fuel consumption, e.g. a vehicle with an idling stopping mechanism, or a hybrid drive vehicle that uses an electro-motor and a water cooled engine. The idling stopping mechanism stops engine 1 as soon as speed of engine 1 drops to idling speed, when stopping temporarily at a crossing, a railroad crossing, and the like. Circulating pump 2 of engine 1 also stops when engine 1 is stopped. In the hybrid drive vehicle a power source is switched from the engine 1 to the electromotor when the power capacity is high enough and the load of the engine is small. As the engine 1 stops its circulation pump 2 will stop and it then is impossible to supply cooling water from engine 1 to compartment heat exchanger 8. In this case it is possible to heat to use the remaining heat of the cooling water of engine 1 successively by operating pump 31 instead of circulating pump 2 and to supply cooling water from engine 1 to compartment heat exchanger 8. When pump 31 sucks cooling water from engine 1, the pressure at the outlet of engine 1 becomes negative and pump 31 tends to suck cooling water cooled in engine radaiator 4. However, cooling water from engine radiator 4 cannot flow backwards via check valve 52 provided between the outlet port of the engine 1 and thermal changeover valve 3. As consequence, only cooling water heated in the engine is supplied to compartment heat exchanger 8 and is used for heating. Above-mentioned pump 31 might not be needed in this heating equipment.

Figure 8:
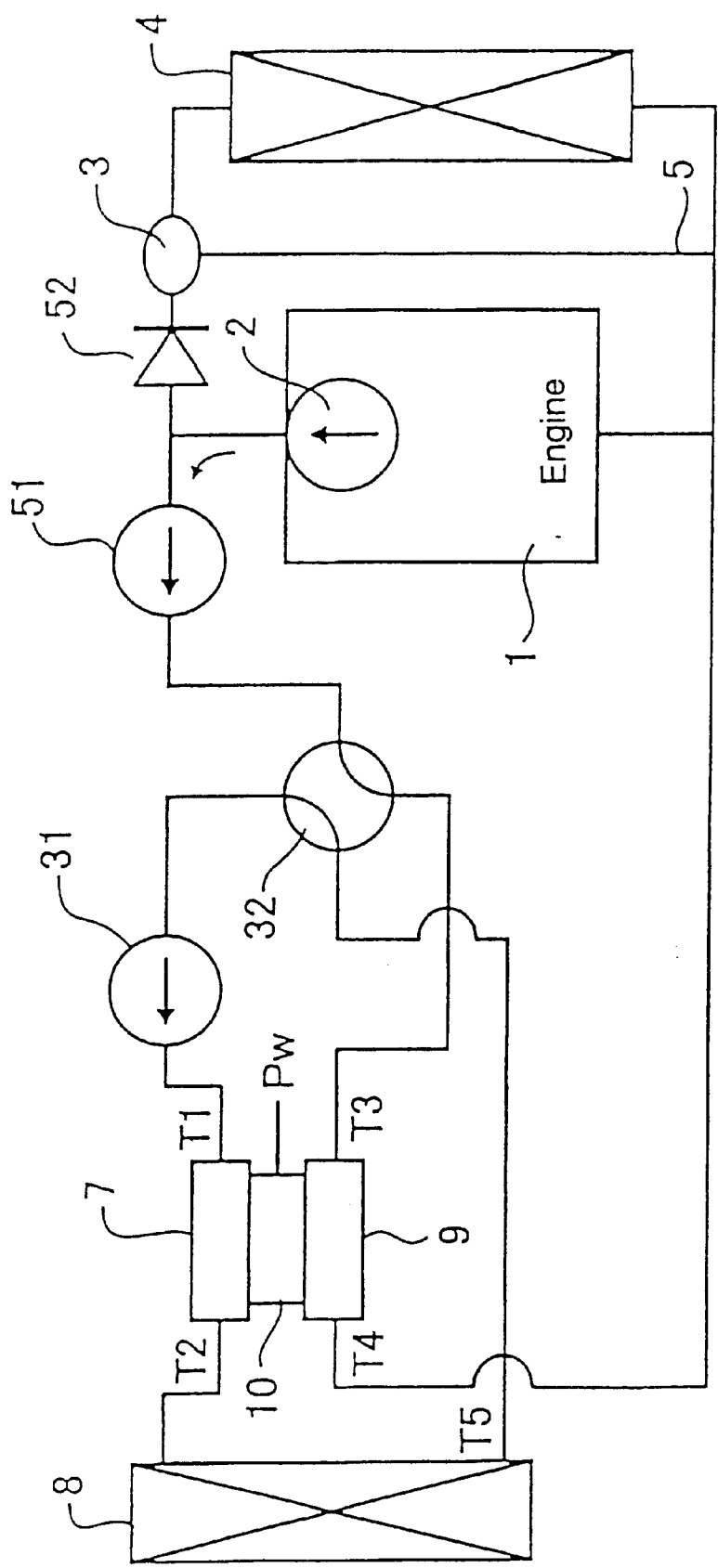

FIG. 8 represents the engine start phase of the third embodiment. After engine start it is possible that the temperature of cooling water at the outlet of compartment heat exchanger 8 is higher than at the outlet of engine 1. In this case (FIG. 8) four-ways valve 32 is switched such that the close circuit for cooling water flowing into heat exchanger 7 and compartment heat exchanger 8 is formed. This means that a circuit with small calorific capacity is formed independent form the engine circuit. The engine circuit would have large calorific capacity. Flow of cooling water then is the same as in FIG. 5. In this small capacity circuit the temperature of the cooling water heated by heat exchanger 7 can be raised quickly such that the interior of the vehicle can be heated early after the engine start. As in this case cooling water from engine 1 is supplied thorugh four-ways valve 32 to heat exchanger 9 by circulating pump 2 there is an endothermic effect by heat exchanger 9 at the endothermic side. However, cooling water in heat exchanger 9 does not flow out if engine 1 stops. Therefore, the cooling water would be refrigerated immediately because the capacity of the cooling water in heat exchanger 9 is small and the endothermic effect also becomes small.

If engine 1 stops while cooling water supplied to compartment heat exchanger 8 is heated by Peltier element 10 after engine start, pump 51 is driven instead of circulation pump 2, and cooling water is compulsively circulated through heat exchanger 9. Pump 51 does not need to be inserted between the outlet port of engine 1 and four-ways valve 32. It may instead be installed between four-ways valve 32 and heat exchanger 9 or between heat exchanger 9 and the outlet port of the engine 1.

Figure 9:
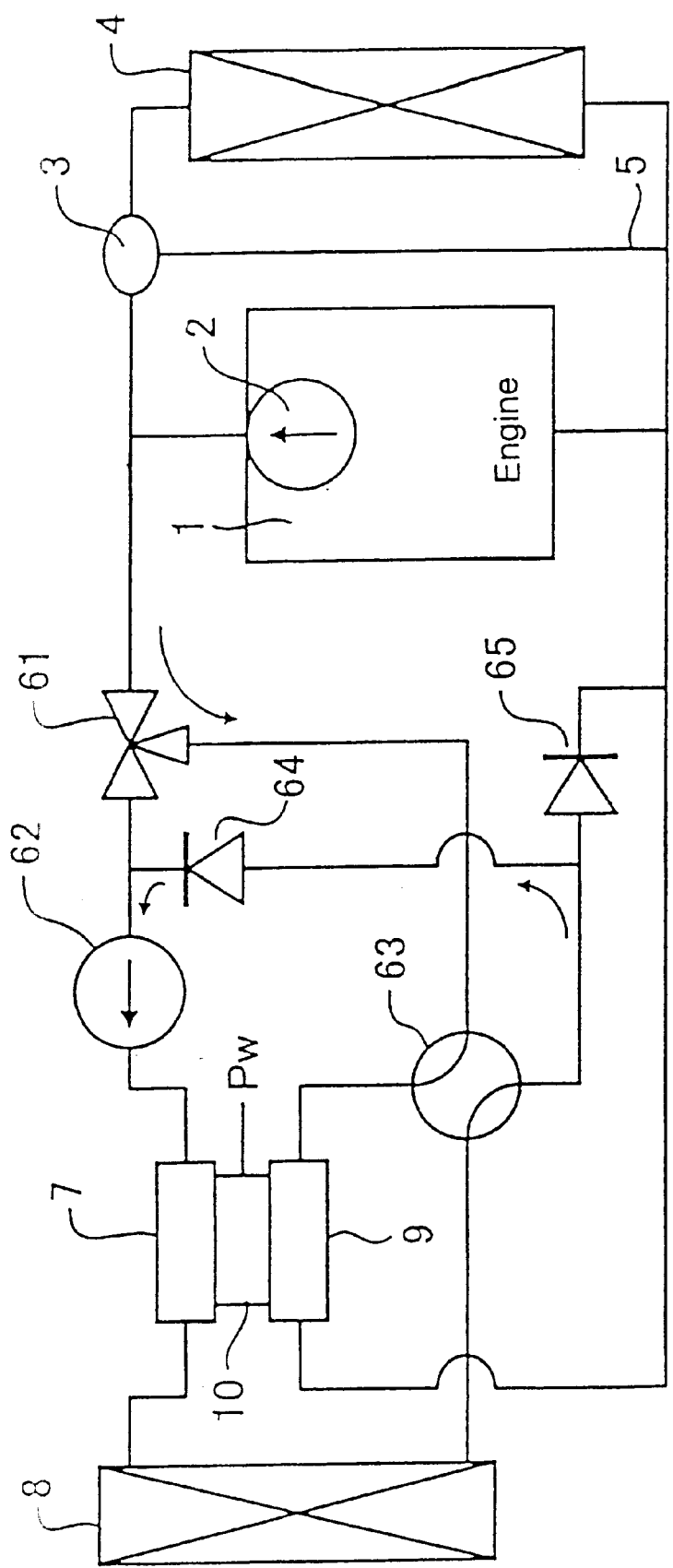

FIG. 9 represents the state shortly after the engine start of a fourth embodiment of a radiator assembly of the vehicle. A three-ways valve 61 and a pump 62 are inserted between an outlet port of the engine 1 and heat exchanger 7. Another outlet port of three-ways valve 61 is connected via a four-ways valve 63 to an inlet port of heat exchanger 9. The outlet port of compartment heat exchanger 8 is connected to four-ways valve 63. An outlet of a passage of the valve 63 is connected via a check valve 64 to a duct extending between three-ways valve 61 and pump 62. Said outlet is also connected via another check valve 65 to the inlet of engine 1. Check valves 64, 65 allow flow from four-ways valve 63 to pump 62 and engine 1.

The flow of cooling water is the same as in FIGS. 5 and 8. A close circuit can be formed when the cooling water discharged by pump 62 flows to heat exchanger 7, is heated therein, flows further to compartment heat exchanger 8 to exchange heat with the air for the vehicle compartment, and finally returns through four-ways valve 63 and check valve 64 to pump 62. Cooling water from the engine 1 flows through three-ways valve 61 and four-ways valve 63 into heat exchanger 9, where heat is absorbed, and returns to engine 1. The same auxiliary heating operation is possible as described in connection with FIGS. 5 and 8.

In this fourth embodiment a close circuit at the side of compartment heat exchanger 8 the four-ways valve 63 is switched when load for compartment heat exchanger 8 is small and the temperature at the outlet of compartment heat exchanger is lower than the temperature at the outlet of engine 1. This is shown in FIG. 10.

Figure 10:
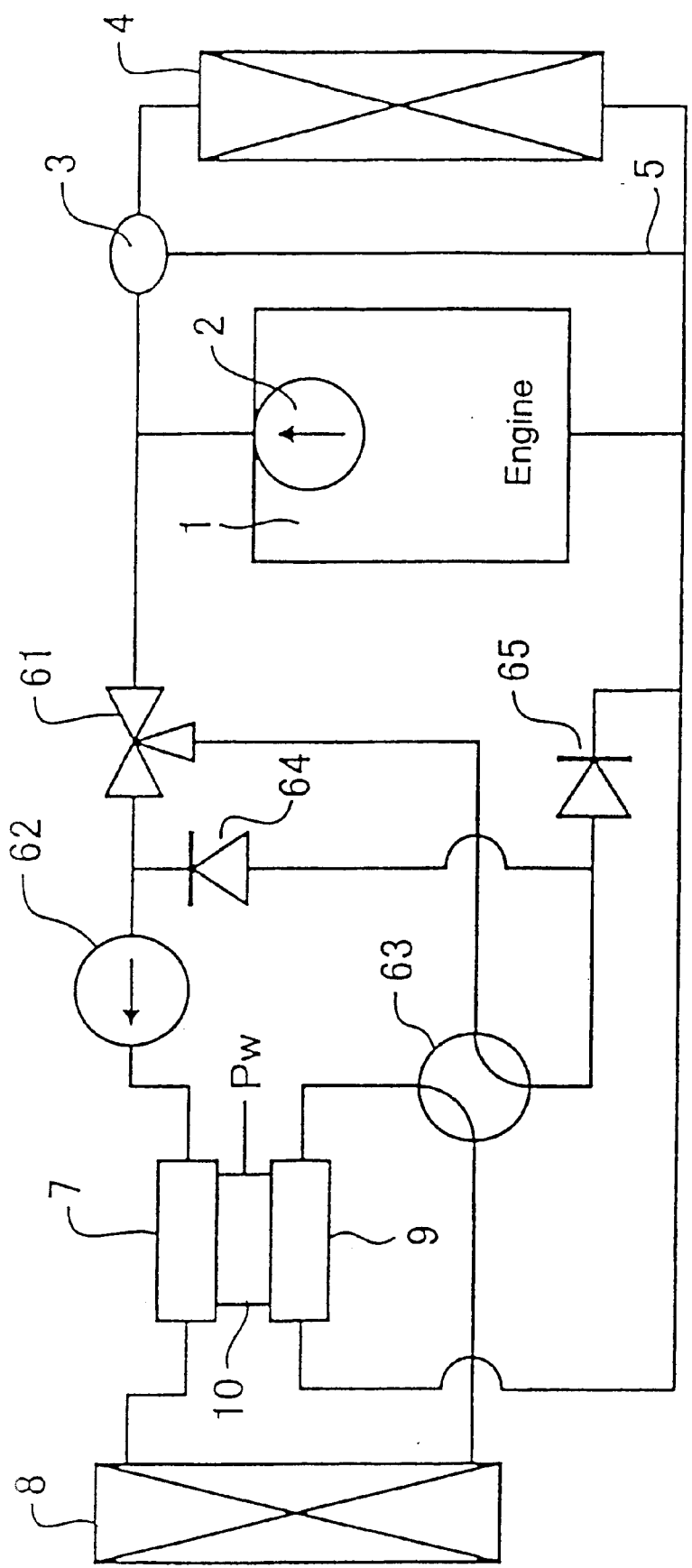

In FIG. 10 the flow is as in FIGS. 1, 4 and 7. Cooling water discharged from engine 1 flows through three-ways valve 61 and pump 62 into heat exchanger 7, is heated there, flows to compartment heat exchanger 8 and exchanges heat with the air. It then flows further through four-ways valve 63 into heat exchanger 9 where heat is absorbed and returns to the engine 1. In addition, if the load of compartment heat exchanger 8 is small, the quantity or flow rate of the cooling water supplied to pump 62 can be limited by three-ways valve 61, so that a bigger amount of cooling water returns through four-ways valve 63 and check valve 65 to engine 1. The quantity of cooling water flowing through pup 62 is stabilised by a by-pass function as mentioned above.

What is claimed is:

1. A radiator assembly of a vehicle comprising:
   a heat source including a cooling water engine radiator, an inlet port and an outlet port;
   a compartment heat exchanging means having an inlet port and an outlet port;
   an exothermic means for heating the cooling water by heat generated by the Peltier effect, wherein the exothermic means includes at least one current supplied Peltier element having an exothermic surface at an exothermic side and an endothermic surface at an endothermic side;
   a first heat exchanging means adhered to the exothermic surface upstream of the compartment heat exchanging means, wherein the first heat exchanging means includes an inlet port and an outlet port;
   a second heat exchanging means adhered to the endothermic surface at the endothermic side of the at least one Peltier element, wherein the second heat exchanging means includes an inlet port and an outlet port;
   at least one pump for circulating cooling water; and
   wherein the second heat exchanging means outlet port is connected by a return duct to the engine radiator inlet port, the second heat exchanging means inlet port is connected to the compartment heat exchanging means outlet port and absorbs heat in the second heat exchanging means from cooling water, the absorbed heat being transferred from the endothermic side of the at least one current supplied Peltier element to the exothermic side and into cooling water passing through the first heat exchanging means.

2. A radiator assembly according to claim 1, further comprising:
   a four-way valve that switches between a first switching position and a second switching position;
   wherein in the first switching position the compartment heat exchanging means outlet port is connected to the first heat exchanging means inlet port, and the engine radiator outlet port is connected to the second heat exchanging means inlet port; and
   wherein in the second switching position the compartment heat exchanging means outlet port is connected to the second heat exchanging means inlet port and the engine radiator outlet port is connected to the first heat exchanging means inlet port.

3. A radiator assembly according to claim 1, wherein the pump circulates cooling water through the first heat exchanging means.

4. A radiator assembly according to claim 2, wherein the four-way valve is switched into the first switching position when the temperature of the cooling water at the compartment heat exchanging means outlet port is higher than the temperature of the cooling water at the engine radiator outlet port, and is switched into the second switching position when the temperature of the cooling water at the engine radiator outlet port is higher than the temperature of the cooling water at the compartment heat exchanging means outlet port.

5. A radiator assembly according to claim 2, wherein a check valve between the engine radiator outlet port and the engine radiator, allows a flow of cooling water in a direction from the engine radiator outlet port to the engine radiator.

6. A radiator assembly according to claim 2, wherein the pump compulsorily circulates cooling water through the second heat exchanging means and the engine radiator in the first switching position of the four-way valve.

7. A radiator assembly according to claim 1, further comprising:
   a three-way valve including an inlet port, a first outlet port and a second outlet port, wherein the valve inlet port is connected to the engine radiator outlet port, the valve first and second outlet ports branch the flow of cooling water, the valve first outlet port is connected to the first heat exchanging means inlet port, the valve second outlet port is connected by a by-pass duct to a return duct to the engine radiator inlet port, the by-pass duct contains a first check valve allowing the flow towards the first heat exchanging means inlet port;
   wherein a second check valve in the return duct between the by-pass duct and the engine radiator inlet port, allows flow towards the engine radiator inlet port only;
   wherein a four-way valve between the compartment heat exchanging means outlet port and the return duct and between the second heat exchanging means inlet port and the second outlet port of the three-way valve is switched into a first switching position and a second switching position,
   wherein in the first switching position the compartment heat exchanging means outlet port is connected by the check valve to the first heat exchanging means inlet port and the engine radiator inlet port, and the second outlet port of the three-way valve is connected to the second heat exchanging means inlet port thereby defining a first closed circuit between the second outlet port and the engine radiator inlet port; and
   wherein in the second switching position the compartment heat exchanging means outlet port is connected to the second heat exchanging means inlet port, thereby defining a second closed circuit between the compartment heat exchanging means and the engine radiator inlet port.

8. A radiator assembly according to claim 7, wherein an additional pump compulsorily circulates cooling water through the first heat exchanging means and is provided between the first outlet of the three-way valve and the first heat exchanging means inlet port.

9. A radiator assembly according to claim 7, wherein the four-way valve is switched into the first switching position when the temperature of the cooling water at the compartment heat exchanging means outlet port is higher than the temperature of the cooling water at the engine radiator outlet port, and is switched into the second switching position when the temperature of the cooling water at the engine radiator outlet is higher than the temperature of the cooling water at the compartment heat exchanging means outlet port.

10. A radiator assembly according to claim 1,
wherein the first heat exchanging means and the second heat exchanging means are heat exchangers that are each adhered to the endothermic surface and the exothermic surfaces of the at least one Peltier element located between both of the heat exchangers, the heat exchangers defining the first heat exchanging means being connected by the first heat exchanging means inlet port to the engine radiator outlet port and by the first heat exchanging means outlet port to the compartment heat exchanging means inlet port, the heat exchangers defining the second heat exchanging means being connected by the second heat exchanging means inlet port to the compartment heat exchanging means outlet port and by the second heat exchanging means outlet port to the engine radiator inlet port.

11. A radiator assembly of a vehicle comprising:
a heat source including a cooling water engine radiator, an inlet port and an outlet port;
a compartment heat exchanging means having an inlet port and an outlet port;
an exothermic means for heating the cooling water by heat generated by the Peltier effect, wherein the exothermic means includes at least one current supplied Peltier element having an exothermic surface at an exothermic side and an endothermic surface at an endothermic side;
a first heat exchanging means adhered to the exothermic surface upstream of the compartment heat exchanging means, wherein the first heat exchanging means includes an inlet port and an outlet port;
a second heat exchanging means adhered to the endothermic surface at the endothermic side of the at least one Peltier element, wherein the second heat exchanging means includes an inlet port and an outlet port;

at least one pump for circulating cooling water;
wherein the second heat exchanging means outlet port is connected by a return duct to the engine radiator inlet port, the second heat exchanging means inlet port is connected to the compartment heat exchanging means outlet port and absorbs heat in the second heat exchanging means from cooling water, the absorbed heat being transferred from the endothermic side of the at least one current supplied Peltier element to the exothermic side and into cooling water passing through the first heat exchanging means;
a four-way valve that switches between a first switching position and a second switching position;
wherein in the first switching position the compartment heat exchanging means outlet port is connected to the first heat exchanging means inlet port, and the engine radiator outlet port is connected to the second heat exchanging means inlet port; and
wherein in the second switching position the compartment heat exchanging means outlet port is connected to the second heat exchanging means inlet port and the engine radiator outlet port is connected to the first heat exchanging means inlet port.

12. A radiator assembly according to claim 11, wherein the pump circulates cooling water through the first heat exchanging means.

13. A radiator assembly according to claim 11, wherein the four-way valve is switched into the first switching position when the temperature of the cooling water at the compartment heat exchanging means outlet port is higher than the temperature of the cooling water at the engine radiator outlet port, and is switched into the second switching position when the temperature of the cooling water at the engine radiator outlet port is higher than the temperature of the cooling water at the compartment heat exchanging means outlet port.

14. A radiator assembly according to claim 11, wherein a check valve between the engine radiator outlet port and the engine radiator allows a flow of cooling water in a direction from the engine radiator outlet port to the engine radiator.

15. A radiator assembly according to claim 11, wherein the pump compulsorily circulates cooling water through the second heat exchanging means and the engine radiator in the first switching position of the four-way valve.

* * * * *